(12) United States Patent
Smith et al.

(10) Patent No.: US 6,682,774 B2
(45) Date of Patent: Jan. 27, 2004

(54) DIRECT APPLICATION OF CATALYSTS TO SUBSTRATES FOR TREATMENT OF THE ATMOSPHERE

(75) Inventors: John R. Smith, Birmingham, MI (US); Michel Farid Sultan, Troy, MI (US); Ming-Cheng Wu, Rochester Hills, MI (US); Zhibo Zhao, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/165,210

(22) Filed: Jun. 7, 2002

(65) Prior Publication Data

US 2003/0228414 A1 Dec. 11, 2003

(51) Int. Cl.[7] .................................................. B05D 1/12
(52) U.S. Cl. ........................................................ 427/180
(58) Field of Search .............................. 427/180, 190, 427/191, 192, 201, 205, 475, 421, 427; 148/537

(56) References Cited

U.S. PATENT DOCUMENTS

| | | | |
|---|---|---|---|
| 3,100,724 A | 8/1963 | Rocheville | |
| 3,993,411 A | 11/1976 | Babcock et al. | |
| 4,263,335 A | 4/1981 | Wagner et al. | |
| 4,606,495 A | 8/1986 | Stewart, Jr. et al. | |
| 4,891,275 A | 1/1990 | Knoll | |
| 4,939,022 A | 7/1990 | Palanisamy | |
| 5,187,021 A | 2/1993 | Vydra et al. | |
| 5,271,965 A | 12/1993 | Browning | |
| 5,302,414 A | 4/1994 | Alkhimov et al. | |
| 5,340,015 A | 8/1994 | Hira et al. | |
| 5,395,679 A | 3/1995 | Myers et al. | |
| 5,424,101 A | 6/1995 | Atkins et al. | |
| 5,464,146 A | 11/1995 | Zalvzec et al. | |
| 5,476,725 A | 12/1995 | Papich et al. | |

(List continued on next page.)

OTHER PUBLICATIONS

Van Steenkiste, et al; *Kinetic Spray Coatings*; in Surface & Coatings Technology III; 1999; pp. 62–71.

Liu, et al; *Recent Development in the Fabrication of Metal Matrix–Particulate Composites Using Powder Metallurgy Techniques*; in Journal of Material Science 29; 1994; pp. 1999–2007; National University of Singapore, Japan.

Papyrin; *The Cold Gas–Dynamic Spraying Method a New Method for Coatings Deposition Promises a New Generation of Technologies*; Novosibirsk, Russia.

McCune, al; *Characterization of Copper and Steel Coatings Made by the Cold Gas–Dynamic Spray Method*; National Thermal Spray Conference.

Alkhimov, et al; *A Method of "Cold" Gas–Dynamic Deposition*; Sov. Phys. Kokl. 36(12; Dec. 1990; pp. 1047–1049.

Dykuizen, et al; *Impact of High Velocity Cold Spray Particles*; in Journal of Thermal Spray Technology 8(4); 1999; pp. 559–564.

Swartz, et al; *Thermal Resistance At Interfaces; Appl. Phys. Lett.*, vol. 51, No. 26,28; Dec. 1987; pp. 2201–2202.

Davis, et al; *Thermal Conductivity of Metal–Matrix Composlites*; J. Appl. Phys. 77 (*10*), May 15, 1995; pp. 4494–4960.

(List continued on next page.)

*Primary Examiner*—Fred J. Parker
(74) *Attorney, Agent, or Firm*—Scott A. McBain (57) ABSTRACT

A method for direct application of a catalyst to a substrate for treatment of atmospheric pollution including ozone. The method includes applying a catalytic metal to a substrate utilizing a kinetic spray process. The process can be utilized to apply a base metal such as copper to a substrate and the base metal becomes the catalytically active oxide following application to the substrate. This system replaces a multi-step process with a single step process to provide a catalytically active surface that can be utilized to reduce ground level ozone and other atmospheric pollutants.

34 Claims, 6 Drawing Sheets

U.S. PATENT DOCUMENTS

| | | | |
|---|---|---|---|
| 5,527,627 | A | 6/1996 | Lautzenhiser et al. |
| 5,593,740 | A | 1/1997 | Strumbon et al. |
| 5,795,626 | A | 8/1998 | Gabel et al. |
| 5,854,966 | A | 12/1998 | Kampe et al. |
| 5,875,626 | A | 3/1999 | Cromartie |
| 5,894,054 | A | 4/1999 | Poruchuri et al. |
| 5,907,761 | A | 5/1999 | Tohma et al. |
| 5,952,056 | A | 9/1999 | Jordan et al. |
| 5,989,310 | A | 11/1999 | Chu et al. |
| 6,033,622 | A | 3/2000 | Maruyama |
| 6,051,045 | A | 4/2000 | Narula et al. |
| 6,051,277 | A | 4/2000 | Claussen et al. |
| 6,074,737 | A | 6/2000 | Jordan et al. |
| 6,129,948 | A | 10/2000 | Plummet et al. |
| 6,139,913 | A | 10/2000 | Van Steenkiste et al. |
| 6,283,386 | B1 | 9/2001 | Van Steenkiste et al. |
| 2002/0168466 | A1 * | 11/2002 | Tapphorn et al. |

OTHER PUBLICATIONS

Stoner et al; *Measurements of the Kapitza Conductance between Diamond and Several Metals*; Physical Review Letters, vol. 68, No. 10; Mar. 9, 1992; pp. 1563–1566.

Stoner et al; *Kapitza conductance and heat flow between solids at temperatures from 50 to 300K*; Physical Review B, vol. 48, No. 22, Dec. 1, 1993–II; pp. 16374;16387.

Johnson et al; *Diamond/Al metal matrix composites formed by the pressureless metal infiltration process*; J. Mater, Res., vol. 8, No. 5, May 1993; pp. 11691173.

Rajan et al; *Reinforcement coatings and interfaces in Aluminium Metal Matrix Composites*; pp. 3491–3503.

*LEC Manufacturing and Engineering Capabilities*; Lanxide Electronic Components, Inc.

Dykhuizen et al; *Gas Dynamic Principles of Cold Spray*; Journal of Thermal Spray Technology; 06–98; pp. 205–212.

McCune et al; *An Exploration of the Cold Gas–Dynamic Spray Method For Several Materials Systems*.

Ibrahim et al; *Particulate Reinforced Metal Matrix Composites—A Review*; Journal of Matrials Science 26; pp. 1137–1156.

* cited by examiner

DIRECT APPLICATION OF CATALYSTS TO SUBSTRATES FOR TREATMENT OF THE ATMOSPHERE

TECHNICAL FIELD

The present invention is directed to a method and apparatus for treatment of the atmosphere, and more particularly, to a method for direct application of catalysts to a substrate and its use to treat atmospheric pollution and an apparatus to accomplish the same.

BACKGROUND OF THE INVENTION

Controlling atmospheric pollution is a concern of increasing importance as the levels of various atmospheric pollutants continue to increase. One primary pollutant of concern is ozone. Various components in the atmosphere can lead to the production of ozone and these compounds include those produced by internal combustion engines. Volatile organic compounds and oxides of nitrogen released into the atmosphere are two primary precursors that lead to formation of ozone in the air via photocatalysis. Most pollution control measures are directed toward removing such ozone precursors at the emission sources.

Recently, a new technology has emerged for treatment of ozone at the ground level utilizing vehicle heat exchangers. Examples of this technology can be found in U.S. Pat. Nos. 6,214,303; 6,212,882; 6,200,542; and 6,190,627. These patents disclose methods for treating atmospheric pollutants by contacting the atmosphere with a catalytic composition on the surface of a substrate. The difficulty with this current technology is that getting the catalytically active compounds to adhere to the substrate requires the use of complicated binders, adhesive layers, and complex surface treatments. These procedures generally involve immersing the entire heat exchanger in a series of coating slurries to obtain a catalytically active surface. The equipment for carrying out these procedures is large and there is the additional difficulty of treating the residue. Finally, treatment of vehicle heat exchangers by these methods can tend to lead to a reduction in the heat exchange efficiency of the heat exchanger, which is undesirable.

It would be advantageous to provide a method for application of catalytically active substances to a substrate that is simple, can be incorporated easily into existing production facilities, is a one-step process, and that can be utilized to apply catalytically active substances to a variety of substrates in addition to heat exchangers.

SUMMARY OF THE INVENTION

In a first embodiment, the present invention is a method of forming a catalytically active surface on a substrate for treatment of atmospheric pollution comprising the steps of: providing a particle mixture comprising a catalytic metal; entraining the particle mixture into a flow of a gas, the gas at a temperature insufficient to cause thermal softening of the particle mixture; and directing the particle mixture entrained in the flow of gas through a supersonic nozzle placed opposite a substrate and accelerating the particle mixture to a velocity sufficient to result in adherence of the particle mixture onto the substrate, the adhered particle mixture forming a catalytically active surface capable of catalyzing the conversion of at least one of ozone, hydrocarbons, or carbon monoxide to oxygen, water and carbon dioxide, and carbon dioxide, respectively.

In a second embodiment, the present invention is a method of forming a catalytically active surface on a substrate for treatment of atmospheric pollution comprising the steps of: providing a particle mixture comprising a catalytic metal; entraining the particle mixture into a flow of a gas, the gas at a temperature insufficient to cause thermal softening of the particle mixture; and directing the particle mixture entrained in the flow of gas through a supersonic nozzle placed opposite a substrate comprising one of a radiator fin stock or a radiator core and accelerating the particle mixture to a velocity sufficient to result in adherence of the particle mixture onto the substrate, the adhered particle mixture forming a catalytically active surface metallically bonded to the substrate, the catalytically active surface being capable of catalyzing the conversion of at least one of ozone, hydrocarbons, or carbon monoxide to oxygen, water and carbon dioxide, and carbon dioxide, respectively.

DESCRIPTION OF THE PREFERRED EMBODIMENT

The present invention comprises a method for formation of a catalytically active surface on a substrate for treatment of atmospheric pollution. In the method a kinetic spray process is used to apply the catalytically active surface to the substrate. The method can be utilized to apply the catalytically active surface to a wide variety of substrates including heat exchangers for vehicles. The method includes use of a kinetic spray process as generally described in U.S. Pat. Nos. 6,139,913, 6,283,386 and an article by Van Steenkiste, et al. entitled "Aluminum coatings via kinetic spray with relatively large powder particles" published in Surface and Coatings Technology 154, pages 237–252, 2002, all of which are herein incorporated by reference.

Figure 1:
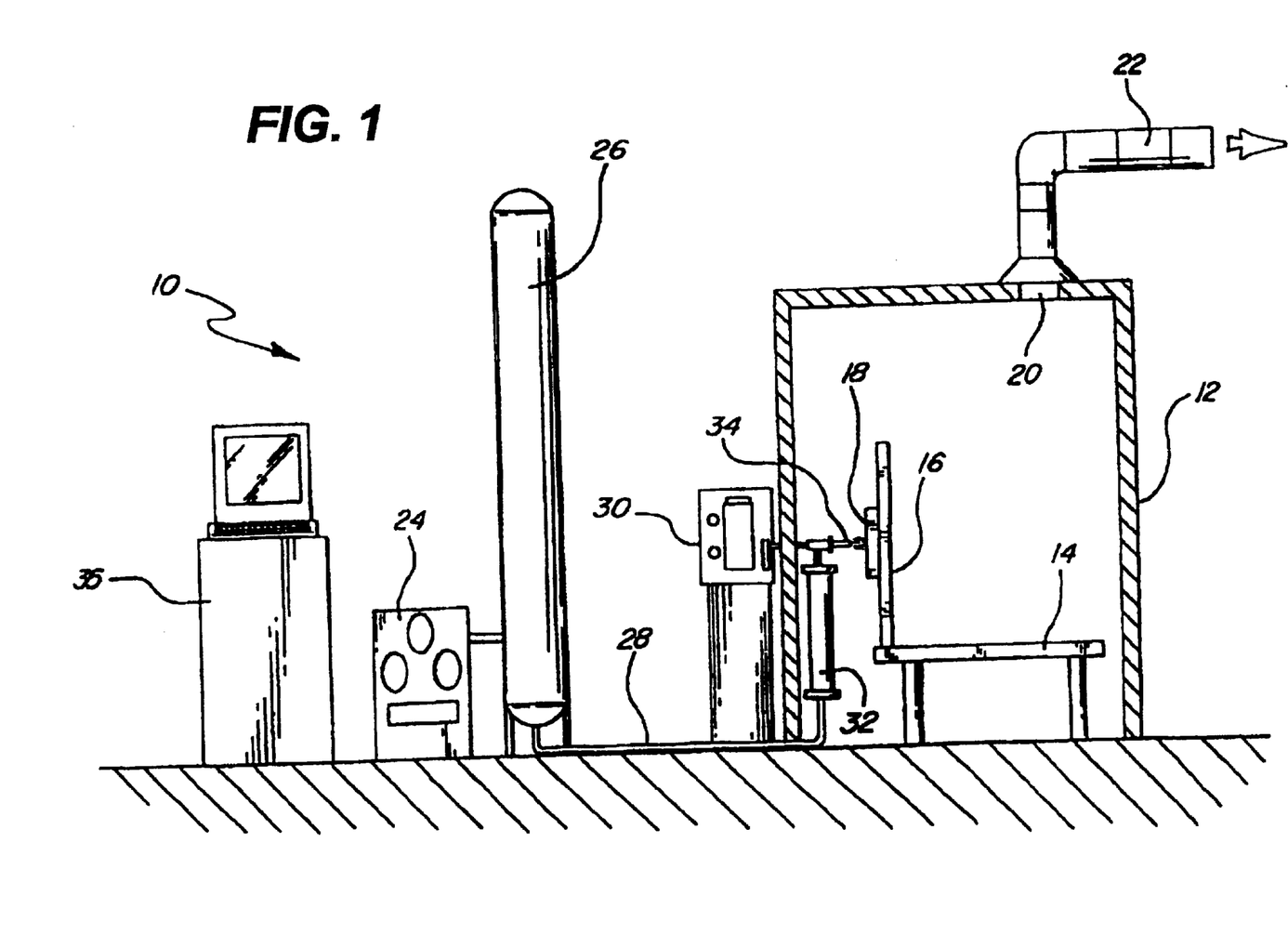
FIG. 1 is a kinetic spray system for use in the present invention.

Referring first to FIG. 1, a kinetic spray system for use according to the present invention is generally shown at 10. System 10 includes an enclosure 12 in which a support table 14 or other support means is located. A mounting panel 16 fixed to the table 14 supports a vertically oriented work holder 18 for holding the substrate to be coated by one or more spray nozzles 34. In one embodiment, the work holder 18 is capable of movement in three dimensions and is able to support a suitable substrate to be coated. The work holder 18 can also be oriented horizontally with movement in three dimensions and be able to support a suitable substrate to be coated. In another embodiment, the work holder 18 is capable of feeding a substrate to be coated past one or more kinetic spray nozzles 34, described below. The enclosure 12 includes surrounding walls having at least one air inlet, not shown, and an air outlet 20 connected by a suitable exhaust conduit 22 to a dust collector, not shown. During coating operations, the dust collector continually draws air from the enclosure 12 and collects any dust or particles contained in the exhaust air for subsequent disposal. Alternatively, the system 10 can be arranged to apply a kinetic spray coating to a substrate being moved past the nozzle(s) on a conveyor as shown below in FIG. 4A or to a substrate being fed past the nozzle(s) as shown in FIG. 5.

The spray system 10 further includes an air compressor 24 capable of supplying air pressure up to 3.4 MPa (500 psi) to a high pressure air ballast tank 26. The air ballast tank 26 is connected through a line 28 to both a high pressure powder feeder 30 and a separate air heater 32. The air heater 32 supplies high pressure heated air, the main gas described below, to a kinetic spray nozzle 34. The temperature of the main gas varies from 100 to 3000° F., depending on the powder or powders being sprayed Preferable from 200 to 1300° F., and more preferably from 500 to 1300° F. The pressure of the main gas and the powder feeder 30 varies from 200 to 500 psi. The powder feeder 30 mixes particles of a single powder or a mixture of particles with unheated high-pressure gases, such as air, nitrogen, or helium, and supplies the particle mixture to a supplemental inlet line 48 of the nozzle 34.

The particles utilized in the present invention comprise the selected catalytic metal. In the specification and the claims a catalytic metal is meant to include both the metal and any of its oxides that are catalytically active. In the present invention the suitable catalytic metals comprise manganese, copper, nickel, iron, chromium, zinc, palladium, platinum, rhodium, ruthenium, silver, gold, and mixtures thereof. The particles used in the present invention preferably have an average nominal diameter of from 60 to 200 microns, and more preferably from 60 to 150 microns.

A computer control 35 operates to control both the pressure of air supplied to the air heater 32 and the temperature of the heated main gas exiting the air heater 32. As would be understood by one of ordinary skill in the art, the system 10 can include multiple powder feeders 30, all of which are connected to one or more supplemental feedline(s) 48 and nozzle(s) 34. For clarity only one powder feeder 30 is shown in FIG. 1.

Figure 2:
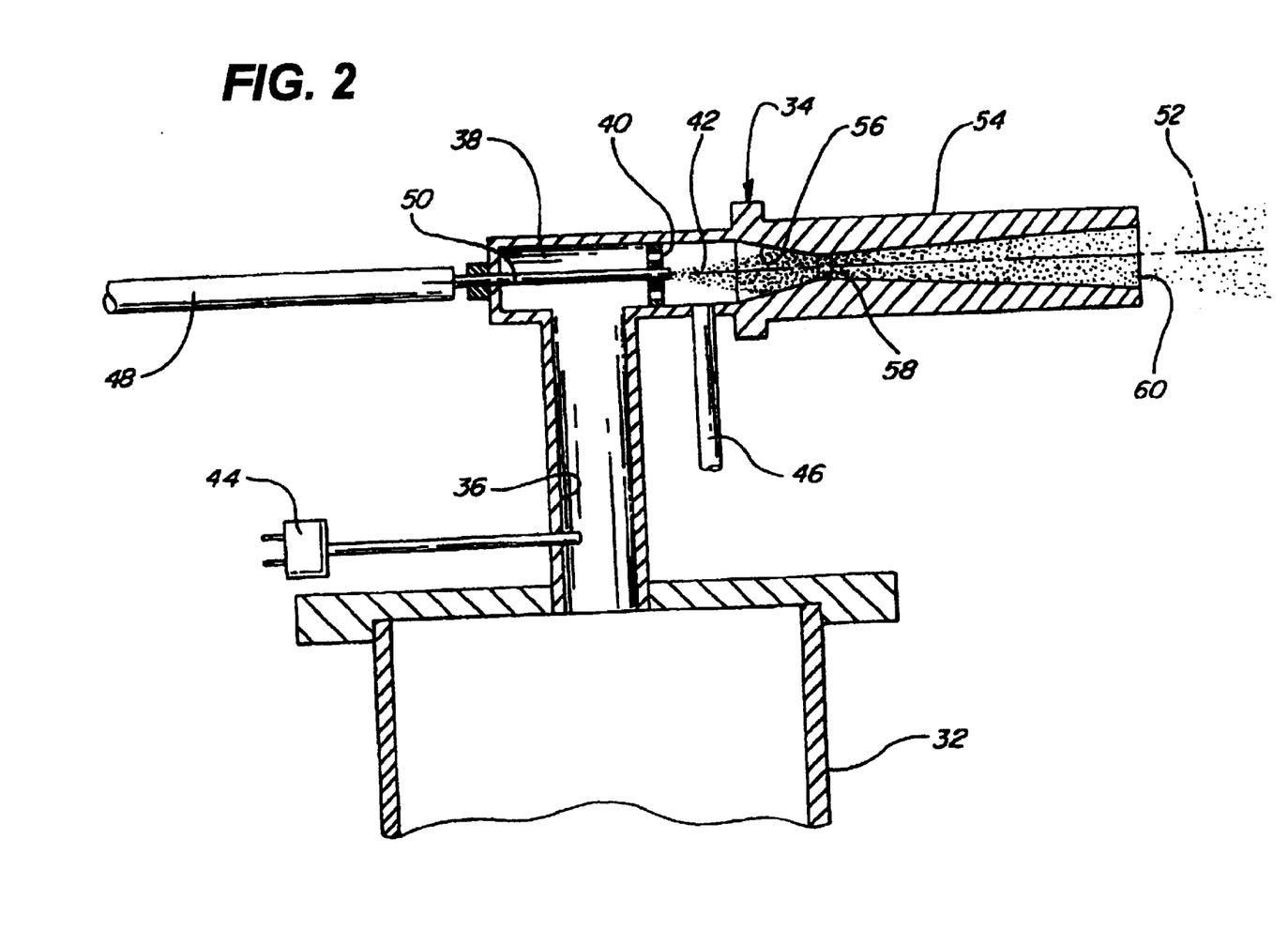
FIG. 2 is a cross-sectional view of a kinetic spray nozzle for use in the present invention.

FIG. 2 is a cross-sectional view of the nozzle 34 and its connections to the air heater 32 and the supplemental inlet line 48. A main air passage 36 connects the air heater 32 to the nozzle 34. Passage 36 connects with a premix chamber 38 which directs air through a flow straightener 40 and into a mixing chamber 42. Temperature and pressure of the air or other heated main gas are monitored by a gas inlet temperature thermocouple 44 in the passage 36 and a pressure sensor 46 connected to the mixing chamber 42.

The mixture of unheated high pressure air and particle powder containing the catalytic metal is fed through the supplemental inlet line 48 to a powder injector tube 50 comprising a straight pipe having a predetermined inner diameter. The predetermined diameter can range from 0.40 to 3.00 millimeters. Preferably it ranges from 0.40 to 0.90 millimeters in diameter. The tube 50 has a central axis 52 which is preferentially the same as the axis of the premix chamber 38. The tube 50 extends through the premix chamber 38 and the flow straightener 40 into the mixing chamber 42.

Mixing chamber 42 is in communication with the de Laval type nozzle 54. The nozzle 54 has an entrance cone 56 that decreases in diameter to a throat 58. Downstream of the throat is an exit end 60. The largest diameter of the entrance cone 56 may range from 10 to 6 millimeters, with 7.5 millimeters being preferred. The entrance cone 56 narrows to the throat 58. The throat 58 may have a diameter of from 3.5 to 1.5 millimeters, with from 3 to 2 millimeters being preferred. The portion of the nozzle 54 from downstream of the throat 58 to the exit end 60 may have a variety of shapes, but in a preferred embodiment it has a rectangular cross-sectional shape. At the exit end 60 the nozzle 54 preferably has a rectangular shape with a long dimension of from 8 to 14 millimeters by a short dimension of from 2 to 6 millimeters. The distance from the throat 58 to the exit end 60 may vary from 60 to 400 millimeters.

As disclosed in U.S. Pat. Nos. 6,139,913 and 6,283,386 the powder injector tube 50 supplies a particle powder mixture to the system 10 under a pressure in excess of the pressure of the heated main gas from the passage 36. The nozzle 54 produces an exit velocity of the entrained particles of from 300 meters per second to as high as 1300 meters per second. The entrained particles gain kinetic and thermal energy during their flow through this nozzle 54. It will be recognized by those of skill in the art that the temperature of the particles in the gas stream will vary depending on the particle size and the main gas temperature. For most catalytic metals utilized in the present invention this temperature is from 300 to 1300° F. The main gas temperature is defined as the temperature of heated high-pressure gas at the inlet to the nozzle 54. These temperatures and the exposure time of the particles are kept low enough that the particles are always at a temperature below their melting temperature so, even upon impact, there is no change in the solid phase of the original particles due to transfer of kinetic and thermal energy, and therefore no change in their original physical properties, The particles exiling the nozzle 54 are directed toward a surface of a substrate to coat it.

Upon striking a substrate opposite the nozzle 54 the particles flatten into a nub-like structure with an aspect ratio of generally about 5 to 1. When the substrate is a metal or alloy and the particles include a metal or an alloy, all the particles striking the substrate surface fracture the oxide shells on the particles and on the surface layer and the metal or alloy particles subsequently form a direct metal-to-metal bond between them and the substrate. This metallic bond secures the catalytic metal to the substrate when the substrate is a metal or an alloy. Upon impact the kinetic sprayed particles transfer substantially all of their kinetic and thermal energy to the substrate surface and stick if their yield stress has been exceeded. As discussed above, for a given particle to adhere to a substrate it is necessary that it reach or exceed its critical velocity which is defined as the velocity at which it will adhere to a substrate when it strikes the substrate after exiting the nozzle 54. This critical velocity is dependent on the material composition of the particle. In general, harder materials must achieve a higher critical velocity before they adhere to a given substrate. The system 10 can also be used to adhere the catalytic metal to other substrates such as plastic or ceramics, however the exact nature of the bond to these substrates is unknown.

The kinetic spray system 10 is extremely versatile in producing any of a variety of coatings. The kinetic spray system 10 is utilized in the present invention to apply the particles to form a catalytically active surface on a substrate. The process can be utilized to apply any base metal or precious metal or other metal. In a preferred embodiment, the catalytic metal comprises manganese, copper, nickel, iron, chromium, zinc, palladium, platinum, rhodium, ruthenium, silver, gold, and mixtures thereof. Non metal powders such as ceramic powders may be mixed with the metal powders to form composite coatings. In some cases, a composite may be desirable. For example, it may be desirable to add the ceramic powder so that the composite thermal expansion coefficient more closely matches that of the substrate, improving the adhesion of the catalytic coating over a range of temperatures. Suitable examples of ceramic powders include diamond, silicon carbide, alumina, and aluminum nitride. As discussed above, preferably the particle mixture has an average nominal particle diameter of from 60 to 200 microns, and more preferably, from 60 to 150 microns. These metals and their oxides are known to be catalytically active, particularly in the conversion of ozone, hydrocarbons, or carbon monoxide to oxygen, water and carbon dioxide, and carbon dioxide, respectively. In utilizing the present invention, one or more of these metals are provided as a powder to the powder feeder 30. As known to those of ordinary skill in the art, the system 10 may utilize either a single powder feeder 30 or a plurality of powder feeders 30, each of which may be connected to its own nozzle 34.

In an alternative embodiment, one powder feeder 30 may be connected to a plurality of nozzles 34. Such systems are described below. Several of the metals discussed above are believed to be catalytically active as the oxide form. These include the metals manganese, copper, iron, nickel, zinc, and chromium. Others, such as palladium, platinum, rhodium, ruthenium, silver, and gold may be catalytically active even when not in the oxide form. It has been surprisingly discovered in the present invention that utilization of the kinetic spray system 10 enables one to spray the metals manganese, copper, nickel, iron, chromium, zinc, palladium, platinum, rhodium, ruthenium, silver, gold, and mixtures thereof directly onto a substrate and achieve a catalytically active surface. Based on the prior art it was thought that some of these would need to be sprayed as their catalytically active oxides, which are extremely hard and unsuitable to utilization in a kinetic spray system 10. In addition, the prior art teaches utilization of resins, binders and adhesives as necessary to adhere these catalysts to substrates.

Figure 3A:
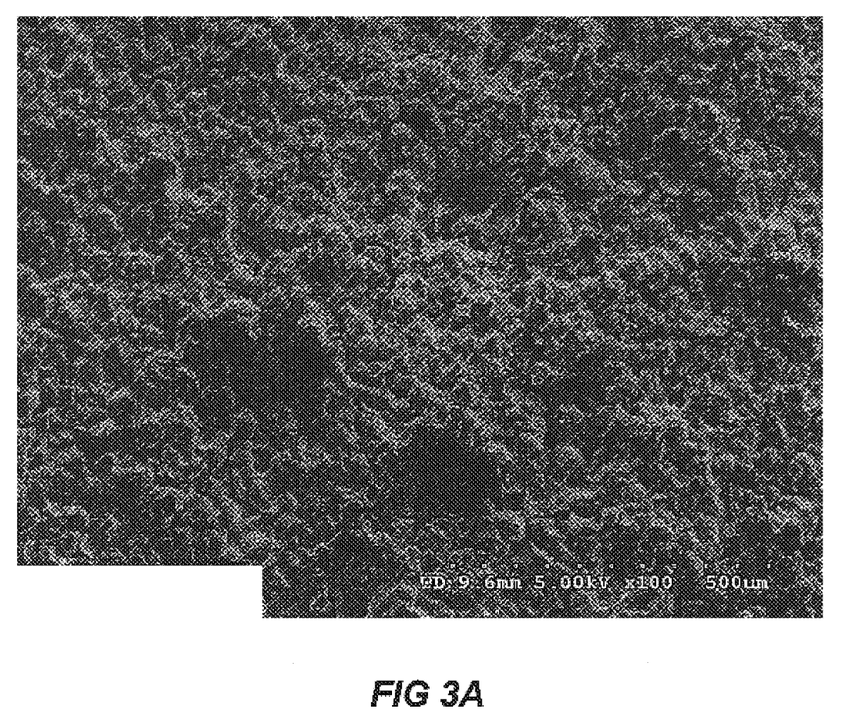
FIG. 3A is a plane view of a catalytically active layer according to the present invention prior to a heat treatment.
Figure 3B:
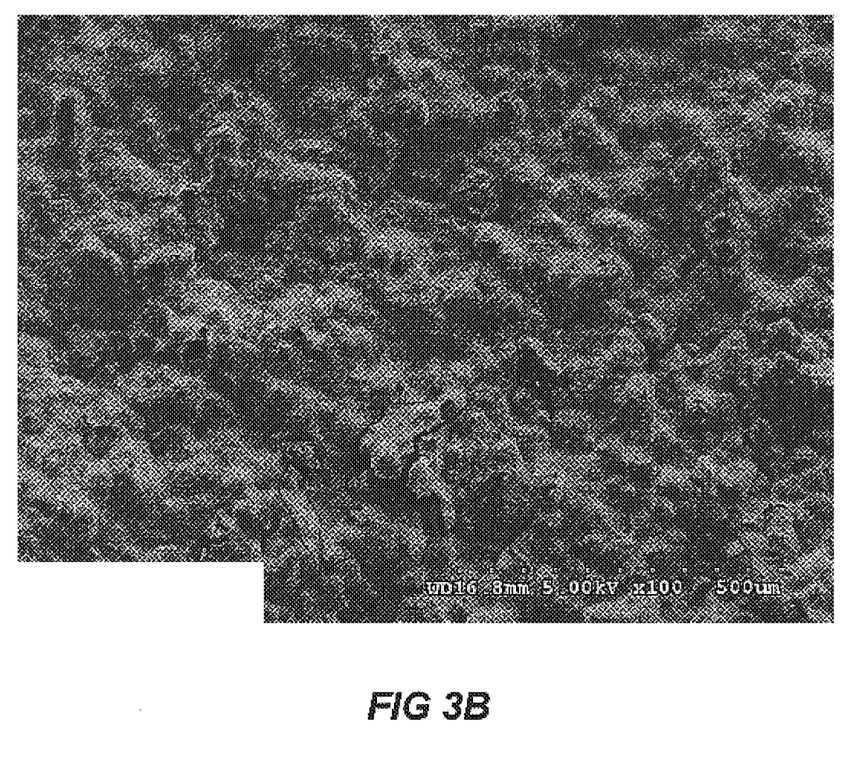
FIG. 3B is a plane view of a catalytically active layer according to the present invention after a heat treatment.

FIGS. 3A and B are scanning electron micrograph photographs of substrates that have been sprayed with copper using the kinetic spray system 10. In FIG. 3A, the surface is shown after initial application of the base metal copper. Note that the surface is rough and shows a great deal of granulation with peaks and valleys. In FIG. 3B, the surface is shown after a heat treatment at 500° C. for 2 hours in an ambient environment. Following the heat treatment the surface is much less rough and the peaks and valleys have flowed together to produce a completely different texture.

Each sample then was analyzed to determine the chemical identity of the surface layer and to probe beneath the surface for the chemical composition. Both samples yielded virtually identical x-ray photoemission spectroscopy (XPS) spectra. The spectra generated were compared to reference spectra of Cu, $Cu_2O$, and CuO. The XPS spectra probes to a depth of approximately 5 to 10 nanometers below the surface. The results demonstrated that for both samples the outer 5 to 10 nanometers were composed entirely of the catalytically active compound CuO. Recall that except for a thin outer oxide shell, the powders sprayed to form this coating were metallic copper. The results demonstrate that the system 10 can be used to apply a pure metal to a substrate and that it forms a catalytically active surface having the metal oxide.

Analysis of the samples using x-ray diffraction showed that the two samples were very different from each other. The pattern from the sample shown in FIG. 3A, the as-sprayed sample, had a very small peak of $Cu_2O$ and a very strong peak from Cu, but no CuO reflections. The sample shown in FIG. 3B had strong reflections from Cu, $Cu_2O$, and CuO. The x-ray diffraction analysis probes to a depth of over 50 microns. This suggests that the outer layer of CuO in the sample as sprayed is very thin, whereas the depth of this layer increases following the heat treatment. It is believed that during the heat treatment in addition to oxidation, crystal growth occurs leading to the change in morphology. It is believed that following heat treatment this surface will provide a larger effective surface area for reduction of atmospheric pollutants. The length and temperature of the heat treatment is determined in part by the identity of the catalytic metal used to form the catalytically active surface. In general, it is preferred that the surface be treated at a temperature of from 300 to 1100° C. for a period of from 20 minutes to 2 hours in an ambient atmosphere that includes oxygen. More preferably, the heat treatment occurs for a period of from 20 minutes to 1 hour. The range of heat treatment, as discussed above, is dependent on the catalytic metal utilized, for example, copper is best treated at temperatures of from 300 to 900° C., while manganese is better treated at temperatures of from 400 to 1100° C. Depending on the identity of the catalytic metal utilized it may not be necessary to engage in a heat treatment following application of the catalytic metal by the kinetic spray procedure. Testing of samples produced according to the present invention demonstrates that they are efficient in removal of ozone from air passed over the samples.

The method disclosed in the present invention can be utilized to apply these catalytic metals to any substrate capable of being sprayed by a kinetic spray system 10. Such substrates include metals, alloys, plastics, and ceramics. Thus, this invention has utilization in preparing catalytically active surfaces in a variety of components not previously possible such as metal surfaces on buildings, metal smokestacks, on billboards, on heating and cooling systems for buildings, and other surfaces exposed to the atmosphere.

The present invention finds special utilization in the application of catalytic metals to surfaces of radiators for vehicles. As discussed in the background of the invention, presently such surfaces are coated with catalytic materials through a multi-step process that includes numerous slurries and baths and, in general, is difficulty to accomplish without utilization of extraneous adhesives, resins, and protective layers.

Figure 4A:
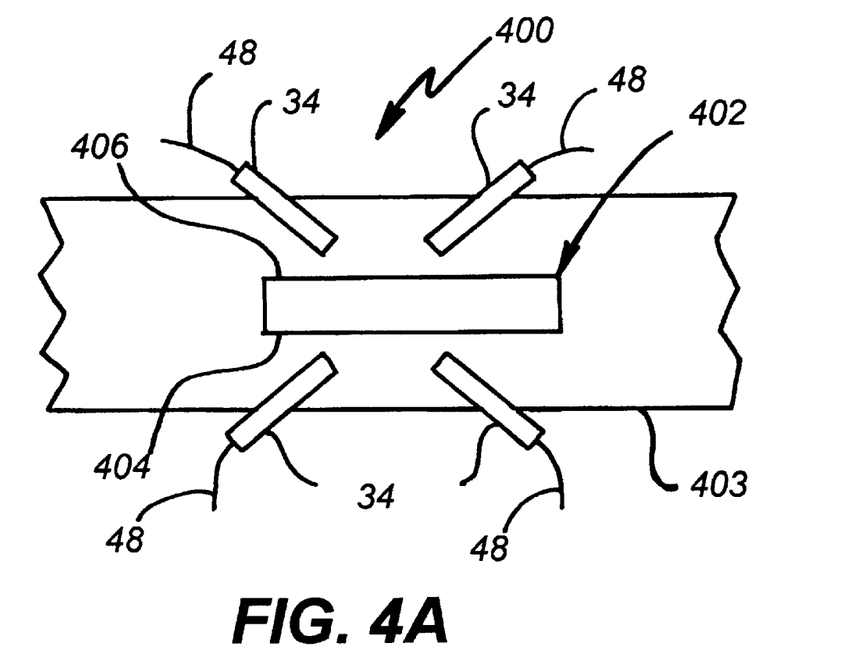
FIG. 4A is a top plane schematic view of a system for application of a catalytically active layer onto a radiator core according to the present invention.
Figure 4B:
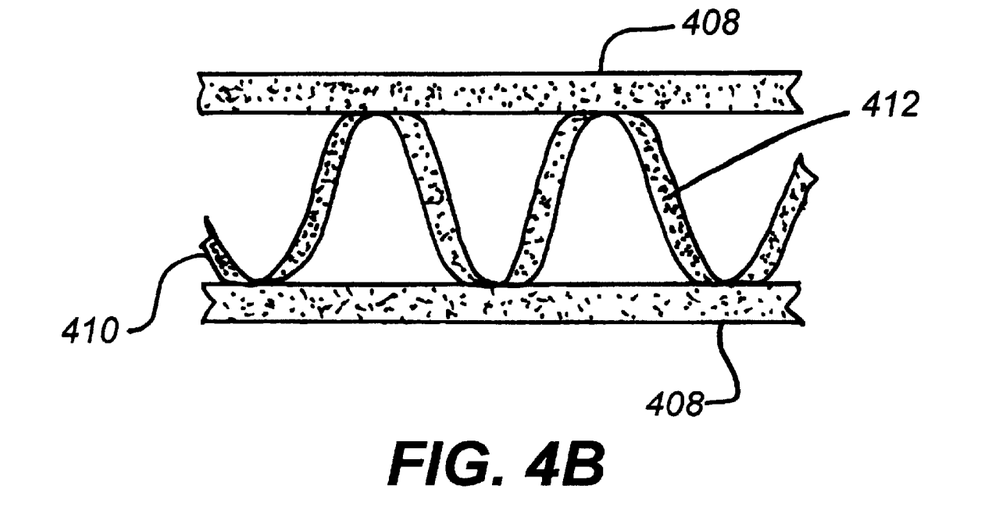
FIG. 4B is an enlarged schematic view of a portion of a radiator core after application of a catalytically active layer onto the radiator core according to the present invention.
Figure 5:
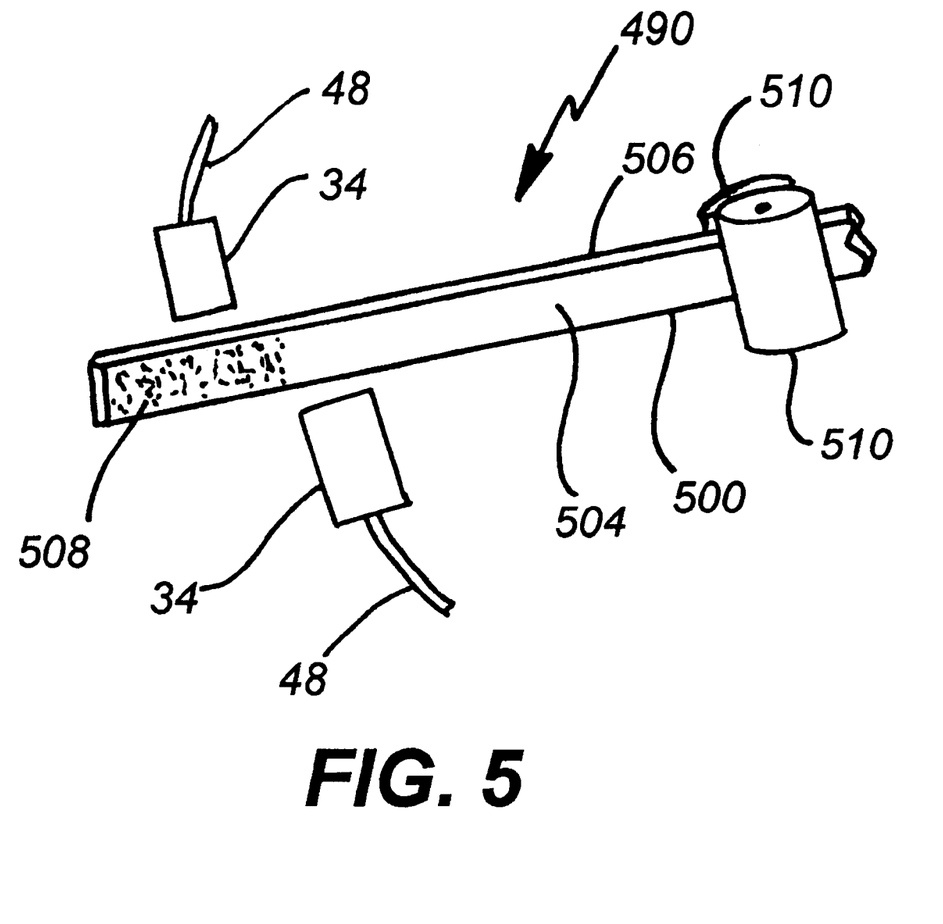
FIG. 5 is a schematic view of a system for application of a catalytically active layer onto radiator fin stock according to the present invention.

FIG. 4A is a top plane view of a system 400 that could be utilized to apply a catalytic metal to a radiator core 402 utilizing the kinetic spray system 10. For clarity, only the inlet lines 48 and nozzles 34 of system 10 are shown. The system 400 includes a conveyor 403 on which is mounted the radiator core 402. The radiator core 402 includes a front face 404 and a rear face 406 each of which are parallel to each other and form a plane of the radiator core 402. The radiator core 402 is moved past a plurality of nozzles 34 connected to inlet lines 48 in turn connected to the kinetic spray system 10 as shown in FIGS. 1 and 2. Although not shown, the nozzles 34 are mounted to any suitable mount. The nozzles 34 are mounted at an angle, preferably from 10 to 45° relative to the front face 404 and the rear face 406 of the radiator core 402. In addition, it may be preferable to mount the nozzles 34 on movable brackets allowing them to move in three dimensions to enable complete coverage of the radiator core 402 as it is moved past the nozzles 34. By positioning nozzles 34 at an angle relative to the front face 404 and the rear face 406 one is able to direct the catalytic metal toward the fins 410, see FIG. 4B, of the radiator core 402. In FIG. 4B, an expanded view of a portion of the radiator core 402 is shown to demonstrate the results of passing a radiator core 402 past the nozzles 34. The nozzles 34 apply a catalytic metal 412 to a series of radiator tubes 408 which are attached to a plurality of corrugated fins 410 of the radiator core 402. The nozzles 34 also deposit catalytic metal 412 on the surfaces of the fins 410. For most radiator cores 402 it is preferable to apply from 80 to 300 grams of catalytic metal 412.

In FIG. 5, an alternative system for applying the catalytic metal 412 and its use in a radiator core 402 is shown at 490. In this method, a fin stock 500 for the corrugated fins 410 of the radiator core 402 is fed past a plurality of nozzles 34 which apply the catalytic metal 412 to a front face 504 and a rear face 502 of the fin stock 500. Such a method can been utilized to feed fin stock 500 past nozzles 34 at a rate of several hundred feet per minute. The stock 500 can be fed using a plurality of feed rollers 510 as shown and by a variety of other methods known to those of ordinary skill in the art. This produces fin stock 500 completely coated with a catalytically active surface 508. This stock 500 can then be utilized during assembly of a radiator core 402. The radiator core and/or the fin stock 500 may also be subjected to a post kinetic spray heat treatment as described above to reoxidize the catalytically active surface 506. Preferably, when the method is utilized to apply the catalytic metal 412 to a radiator core 402 the heat treatment is conducted at a temperature of from 300 to 550 degrees Celsius to preserve the brazed joints.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A method of forming a catalytically active surface on a substrate for treatment of atmospheric pollution comprising the steps of:
    a) providing a particle mixture comprising a catalytic metal;
    b) entraining the particle mixture into a flow of a gas, the gas at a temperature insufficient to cause thermal softening of the particle mixture; and
    c) kinetically spraying the particle mixture entrained in the flow of gas through a supersonic nozzle placed opposite a substrate and accelerating the particle mixture to a velocity sufficient to result in adherence of the particle mixture onto the substrate, the catalytic metal of the adhered particle mixture forming a catalytically active surface capable of catalyzing the conversion of at least one of ozone, hydrocarbons, or carbon monoxide to oxygen, water and carbon dioxide, and carbon dioxide, respectively.

2. The method of claim 1 comprising the further step of maintaining the catalytically active surface at a temperature of from 300 to 1100 degrees Celsius for a period of from 20 minutes to 2 hours in an atmosphere comprising air.

3. The method of claim 2, wherein the catalytically active surface is maintained at a temperature of from 300 to 1100 degrees Celsius for a period of from 20 minutes to 1 hour in an atmosphere comprising air.

4. The method of claim 2, wherein the catalytically active surface is maintained at a temperature of from 300 to 900 degrees Celsius for a period of from 20 minutes to 2 hours in an atmosphere comprising air.

5. The method of claim 2, wherein the catalytically active surface is maintained at a temperature of from 300 to 900 degrees Celsius for a period of from 20 minutes to 1 hour in all atmosphere comprising air.

6. The method of claim 1, wherein step a) comprises providing a catalytic metal comprising manganese, copper, nickel, iron, chromium, zinc, palladium, platinum, rhodium, ruthenium, silver, gold, and mixtures thereof.

7. The method of claim 1, wherein step a) comprises providing a particle mixture having an average nominal particle diameter of from 60 to 200 microns.

8. The method of claim 1, wherein step a) comprises providing a particle mixture having an average nominal particle diameter of from 60 to 150 microns.

9. The method of claim 1, wherein step b) comprises providing the gas at a temperature of from 200 to 1300 degrees Fahrenheit.

10. The method of claim 1, wherein step a) comprises providing the gas at a temperature of from 500 to 1300 degrees Fahrenheit.

11. The method of claim 1, wherein step c) comprises accelerating the particle mixture to a velocity of from 300 to 1300 meters per second.

12. The method of claim 1, wherein step c) further comprises forming an outer layer of a metal oxide, the outer layer being the catalytically active surface.

13. The method of claim 12, comprising forming an outer layer of a metal oxide having a thickness of from 2 to 15 microns.

14. The method of claim 1, wherein step c) comprises providing one of a radiator fin stock or a radiator core as the substrate.

15. The method of claim 14, further comprising providing a radiator core as the substrate and directing the particle mixture entrained in the flow of gas through a supersonic nozzle placed at an angle of from 10 to 45 degrees relative to a plane of the core.

16. The method of claim 15, further comprising providing a plurality of nozzles placed at an angle of from 10 to 45 degrees relative to the plane of the core, each of the nozzles receiving a particle mixture entrained in a flow of a as.

17. The method of claim 1, further comprising the step of exposing the catalytically active surface to the atmosphere to catalyze the conversion of at least one of ozone, hydrocarbons, or carbon monoxide to oxygen, water and carbon dioxide, and carbon dioxide, respectively.

18. The method of claim 1, wherein step a) further comprises providing a particle mixture comprising a ceramic powder and a catalytic metal.

19. The method of claim 18, comprising providing a ceramic powder comprising diamond, silicon carbide, alumina, aluminum nitride, or mixtures thereof.

20. A method of forming a catalytically active surface on a substrate for treatment of atmospheric pollution comprising the steps of:
    a) providing a particle mixture comprising a catalytic metal;
    b) entraining the particle mixture into a flow of a gas, the gas at a temperature insufficient to cause thermal softening of the particle mixture; and
    c) kinetically spraying the particle mixture entrained in the flow of gas through a supersonic nozzle placed opposite a substrate comprising one of a radiator fin stock or a radiator core and accelerating the particle mixture to a velocity sufficient to result in adherence of the particle mixture onto the substrate, the catalytic metal of the adhered particle mixture forming a catalytically active surface bonded to the substrate, the catalytically active surface being capable of catalyzing the conversion of at least one of ozone, hydrocarbons, or carbon monoxide to oxygen, water and carbon dioxide, and carbon dioxide, respectively.

21. The method of claim 20, wherein step c) further comprises providing a radiator core as the substrate and directing the particle mixture entrained in the flow of gas through a supersonic nozzle placed at an angle of from 10 to 45 degrees relative to a plane of the core.

22. The method of claim 21, further comprising providing a plurality of nozzles placed at an angle of from 10 to 45 degrees relative to the plane of the core, each of the nozzles receiving a particle mixture entrained in a flow of a gas.

23. The method of claim 20 comprising the further step of maintaining the catalytically active surface at a temperature of from 300 to 1100 degrees Celsius for a period of from 20 minutes to 2 hours in an atmosphere comprising air.

24. The method of claim 23, wherein the catalytically active surface is maintained at a temperature of from 300 to 900 degrees Celsius for a period of from 20 minutes to 2 hours in an atmosphere comprising air.

25. The method of claim 20, wherein step a) comprises providing a particle mixture containing a catalytic metal comprising manganese, copper, nickel, iron, chromium, zinc, palladium, platinum, rhodium, ruthenium, silver, gold, and mixtures thereof.

26. The method of claim 20, wherein step a) comprises providing a particle mixture having an average nominal particle diameter of from 60 to 200 microns.

27. The method of claim 20, wherein step a) comprises providing a particle mixture having an average nominal particle diameter of from 60 to 150 microns.

28. The method of claim 20, wherein step b) comprises providing the gas at a temperature of from 200 to 1300 degrees Fahrenheit.

29. The method of claim 20, wherein step c) comprises accelerating the particle mixture to a velocity of from 300 to 1300 meters per second.

30. The method of claim 20, wherein step c) further comprises forming an outer layer of a metal oxide, the outer layer being the catalytically active surface.

31. The method of claim 30, comprising forming an outer layer of a metal oxide having a thickness of from 2 to 15 microns.

32. The method of claim 30, wherein step c) comprises adhering from 80 to 300 grams of the particle mixture onto a radiator core, the catalytically active surface forming on the surface of the catalytic metal.

33. The method of claim 20, wherein step a) further comprises providing a particle mixture comprising a ceramic powder and a catalytic metal.

34. The method of claim 33, comprising providing a ceramic powder comprising diamond, silicon carbide, alumina, aluminum nitride, or mixtures thereof.

* * * * *